(12) United States Patent
Poston et al.

(10) Patent No.: US 9,690,824 B2
(45) Date of Patent: *Jun. 27, 2017

(54) METHODS AND SYSTEMS FOR SEARCHING A DATABASE OF OBJECTS

(71) Applicant: Q-SENSEI CORP., Brooklyn, NY (US)

(72) Inventors: Timothy Poston, Singapore (SG); Raghu Raghavan, Baltimore, MD (US); Michael Fenton, Chapel Hill, NC (US); David Poston, Suffolk (GB)

(73) Assignee: Q-SENSEI CORP., Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/857,590

(22) Filed: Apr. 5, 2013

(65) Prior Publication Data
US 2013/0226963 A1  Aug. 29, 2013

Related U.S. Application Data

(63) Continuation of application No. 12/694,905, filed on Jan. 27, 2010, now Pat. No. 8,438,180, which is a continuation of application No. 11/444,403, filed on Jun. 1, 2006, now Pat. No. 7,680,777, which is a
(Continued)

(51) Int. Cl.
*G06F 17/30* (2006.01)
(52) U.S. Cl.
CPC .. *G06F 17/30424* (2013.01); *G06F 17/30873* (2013.01); *Y10S 707/956* (2013.01); *Y10S 707/99931* (2013.01); *Y10S 707/99933* (2013.01); *Y10S 707/99943* (2013.01)

(58) Field of Classification Search
None
See application file for complete search history.

(56) References Cited

U.S. PATENT DOCUMENTS

| 5,825,944 A | 10/1998 | Wang |
| 5,924,090 A | 7/1999 | Krellenstein |
| 6,169,992 B1 * | 1/2001 | Beall et al. |

(Continued)

OTHER PUBLICATIONS

Juliano Lopes de Oliveira and Ricardo de Oliveira Anido discloses (1993), Browsing and Querying in Object-Oriented Databases, pp. 364-373.

(Continued)

*Primary Examiner* — Syed Hasan
(74) *Attorney, Agent, or Firm* — DLA Piper LLP US

(57) ABSTRACT

Methods and Systems for searching a database of Objects. Each Object is associated with a plurality of Attributes, each Attribute is associated with a Kind, and each Kind is associated with a plurality of Attributes. Search criteria comprising an Attribute is received. A Nonceattribute is created using the search criteria. A search utilizing the Nonceattribute is inputted. All Objects having the Nonceattribute are identified. All Attributes associated with the Objects are identified. All Kinds associated with the Attributes are identified. A ranking criterion is applied to identified Kinds and Attributes. The highest-ranked portion of the Kinds and the highest-ranked portion of the Attributes that can readably be shown in a search result display are displayed.

18 Claims, 7 Drawing Sheets

Related U.S. Application Data continuation of application No. 10/142,911, filed on May 13, 2002, now Pat. No. 7,080,059.

(56) References Cited

U.S. PATENT DOCUMENTS

| | | | |
|---|---|---|---|
| 6,175,830 | B1 | 1/2001 | Maynard |
| 6,356,899 | B1 | 3/2002 | Chakrabarti et al. |
| 6,543,046 | B1 | 4/2003 | Lunt |
| 6,704,729 | B1 | 3/2004 | Klein et al. |
| 6,842,888 | B2 | 1/2005 | Roberts |
| 2001/0007104 | A1 | 7/2001 | Goldberg |
| 2001/0034733 | A1 | 10/2001 | Prompt et al. |
| 2002/0049792 | A1 | 4/2002 | Wilcox et al. |
| 2002/0051020 | A1 | 5/2002 | Ferrari et al. |
| 2002/0113817 | A1* | 8/2002 | Mitsugi .......................... 345/744 |
| 2002/0152222 | A1 | 10/2002 | Holbrook |
| 2002/0198885 | A1 | 12/2002 | Steepy, Jr. |

OTHER PUBLICATIONS

English, Jennifer et al., Hierarchical Faceted Metadata in Site Search Interfaces, http://flamenco.berkeley.edu/papers/chi02_short_paper.pdf (CHI 2002 Conference Companion, Apr. 20-25, 2002).

Hearst, Marti A., Next Generation Web Search: Setting Our Sites http://flamenco.berkeley.edu/papers/data-engineering.pdf (IEEE Data Engineering Bulletin, Special issue on Next Generation Web Search, Luis Gravano (Ed.), Sep. 2000).

Elliott, Ame, Flamenco Image Browser: Using Metadata to Improve Image Search During Architectural Design http://flamenco.berkeley.edu/papers/elliott-doctoral-consortium01.pdf (Ame Elliott, Doctoral Consortium, in the Proceedings of the ACM CHI 2001 Conference Companion, Seattle, WA, Apr. 2001).

English, Jennifer et al., Flexible Search and Navigation using Faceted Metadata, http://flamenco.berkeley.edu/papers/flamenco02.pdf (Jennifer English, Marti Hearst, Rashmi Sinha, Kirsten Swearingen, and Ping Yee, unpublished manuscript, Jan. 2002).

English, Jennifer et al., Examining the Usability of Web Site Search http://flamenco.berkeley.edu/papers/epicurious-study.pdf (Jennifer English, Marti Hearst, Rashmi Sinha, Kirsten Swearingen, and Ping Yee, unpublished manuscript, 2001).

International Search Report issued in International Application No. PCT/US03/14748, mailed Sep. 24, 2003.

Written Opinion issued in International Application No. PCT/US03/14748, mailed Sep. 24, 2003.

International Preliminary Report on Patentability issued in International Application No. PCT/US03/14748, mailed Sep. 24, 2003.

www.giage.com (4 pages), archived Mar. 30, 2002.

www.plumtree.com (21 pages), archived Mar. 30, 2002.

www.autonomy.com (14 pages), printed Dec. 3, 2008.

"Giage Introduces Webspace to End Information Overload: Innovative Productivity Software"; Business Wire, Sep. 13, 1999.

\* cited by examiner

METHODS AND SYSTEMS FOR SEARCHING A DATABASE OF OBJECTS

CROSS REFERENCE TO RELATED APPLICATIONS

This application is a continuation of U.S. patent application Ser. No. 12,694,905, filed Jan. 27, 2000, which continuation of U.S. patent application Ser. No. 11/444,403, filed Jun. 1, 2006 (now U.S. Pat. No. 7,680,777, issued Mar. 16, 2010), which is a continuation of U.S. patent application Ser. No. 10/142,911, filed May 13, 2002 (now U.S. Pat. No. 7,080,059, issued Jul. 18, 2006), which are herein incorporated by reference in their entirety.

BACKGROUND OF THE INVENTION

Field of the Invention

The present invention relates generally to the field of computer navigation in large heterogeneous collections of objects, and more particularly to a method and apparatus for searching for information, exploring the contents of a collection, and organizing the results in a manner based upon the search or navigation specifications.

Discussion of the Background

Existing search and presentation programs leave much to be desired. The typical computer user is faced with a wide variety of usable information: passive information such as document files and images on the local computer and local net, email messages, web sites and web pages, databases, etc., and actively structured information that will process other data; search engines, statistical analysis tools, editors, browsers, mesh reduction tools, file format converters, fife transfer utilities, and so on. Tools for looking around among these objects come, to use a flashlight analogy, in 'wide beam' and 'narrow beam' forms. In a textbook analogy, the wide beam corresponds to using the table of contents (where sections appear in context) and the narrow beam to the index, Software development has concentrated narrowly on searching—the analogue of the index—while neglecting content presentation.

Wide Seam Form

In a wide beam form, items are visible as the leaves on a tree of 'directories' or 'folders', or in a window corresponding to one of these. Email messages appear as a list and perhaps also in a tree arrangement, usually managed separately by the user's mail software. Web sites, databases and search engines appear one by one or in small groups, each group usually appearing as a set of clickable elements in a list or graphically arranged hypertext document created and controlled by its author, not adjustable by the user. Tools on the user's computer appear in a separate tree such as the Programs menu in Microsoft Windows, with no way to call up 'those that modify images', 'those that enable computer-aided design', 'those that modify documents', etc., unless an expert user arranges them in such groups C and grouping in one way precludes a display grouped otherwise.

The large scale view of what is available is thus fragmented, and rigid, A user who wishes to arrange files by type (for example, placing large 3D scan files on a dedicated disk) cannot simultaneously view them arranged by project. Often the user cannot rearrange the view at all, as with a web page. Tools that support display of the user's own preferred grouping in a new context, as Giage's Webspace product (www.webspace.com) does for web pages, make any change override a previous view. This is like changing Dewey system library classifications or moving physical documents into a different arrangement of physical folders: the old arrangement is lost. The loss is wholly unnecessary when "place a file in a folder" really means "include in the folder's data the physical disk address of the file", which can be repeated for one file with multiple folders. It is equally unnecessary for all other data objects. (Windows allows placement of a 'shortcut' to a file in a second folder, but insists on displaying it and treating it differently. There is no provision for multiple ways to group files for display, with user-controlled movement between them.)

Narrow Beam Form

Search tools provide answers to highly explicit queries. The Windows 'Find' tool or a search engine such as Lycos, HotBot, etc., look for objects with tightly defined characteristics: a file with a particular name or part of one, extension, range of dates or sizes, or containing a particular word; a web page on which certain words or phrases occur. This resembles searching a crowded room in darkness, using a laser pointer. Without seeing what is around what it lights, it is hard to improve one's aim and zero in on what one is seeking, or to find related material that adds context to an object found, as one does in turning to a table of contents to see what surrounds an item found in an index.

A user's query is in fact rich with implications as to what Kind of object could be of interest, but no current engine attempts to build a wider view helpful to the user. (The closest to this, in the search engine case, is that certain sites clamor for attention when it just might be relevant. For example, a search for the two words 'breast stroke' can return a mixture of listed swimming sites with paid ads for WebMD.com for those interested in breast health, and porn sites for other concerns.) Results are rarely sorted in any way, and where they are (for instance, by the NorthernLight search engine) it is into categories pre-established by the search tool. There is no attempt to respond to the way that the user groups things.

What is needed is a more efficient way to explore what is present, as well as to conduct searches for particular items and present search results to a user so that the user can not merely locate quickly the items of interest, but learn quickly about the presence of related items—where 'related' is a user-dependent concept.

SUMMARY OF THE INVENTION

The present invention provides a framework in which to embed searches in wider displays, integrated across objects of many Kinds and accessible in many ways, that respond to the user's priorities, as implied by queries and other interactions, without identifying such a display with a filing-cabinet-like positioning of the objects themselves. The same item (e.g., a recording of Beethoven's $5^{th}$ Symphony) is findable under both recordings and composers, rather than compelling the user to guess which sorting principle was uppermost in the cataloguer's mind. The user may change view, return to a previous view, share a view with another user, or obtain a view from another source, without disrupting the organization of storage.

A database of ObjectIDs, each of which refers to some defined digital object (a file, a paragraph, a data channel, a web page, etc., as the application requires) and contains the information necessary for appropriate software to locate and preferably access this object, is maintained. A database of Attributes is also maintained. Each object in the database has one or more Attributes associated with it. Additionally, a database of Kinds is maintained. Each Attribute is associated with a single Kind, but each Kind may be associated with several Attributes. For example, an object such as an MP3 file of a recording of Frank Sinatra singing "New York, New York" may have an Attribute equal to 'modern' of a Kind 'period'. A different recording, such as a recording of Beethoven's $5^{th}$ Symphony, may have an Attribute equal to 'Renaissance' of a Kind 'period'. Both of these objects may also have an Attribute equal to 'Music' of a Kind 'art form'. Neither one of these objects would have an Attribute of a Kind 'genre' (which might have Attributes relevant to written works, such as horror, mystery, biography, etc.).

The Attributes and Kinds are used in two ways. First, the grouping of Attributes into Kinds speeds up searches in that testing objects to determine if the objects have a particular Attribute is not performed if the objects do not have Attributes of that Kind associated with the object to be tested. For example, if a user specified an Attribute of 'horror' in a search query, testing objects such as recordings for the 'horror' Attribute could be avoided by first determining that recordings do not have Attributes of that Kind. Second, Attributes, Kinds and item identifiers are used to display search results in a mutable, hierarchical format such as a tree, nested overlapping regions, or other presentation, that allows users to quickly locate objects relevant to their search. The hierarchical format is independent of factors such as location of an object in a hierarchical structure. For example, if a user specified three Attributes in a search query, then the objects that satisfy the search result could be made available to the user by displaying Kinds (different from the Kinds associated with the Attributes specified in the search query) associated with those objects and allowing the user to select desired Attributes from among those Kinds.

BRIEF DESCRIPTION OF THE DRAWINGS

A more complete appreciation of the invention and many of the attendant advantages and features thereof will be readily obtained as the same becomes better understood by reference to the following detailed description when considered in connection with the accompanying drawings, wherein.

DETAILED DESCRIPTION

Figure 1:
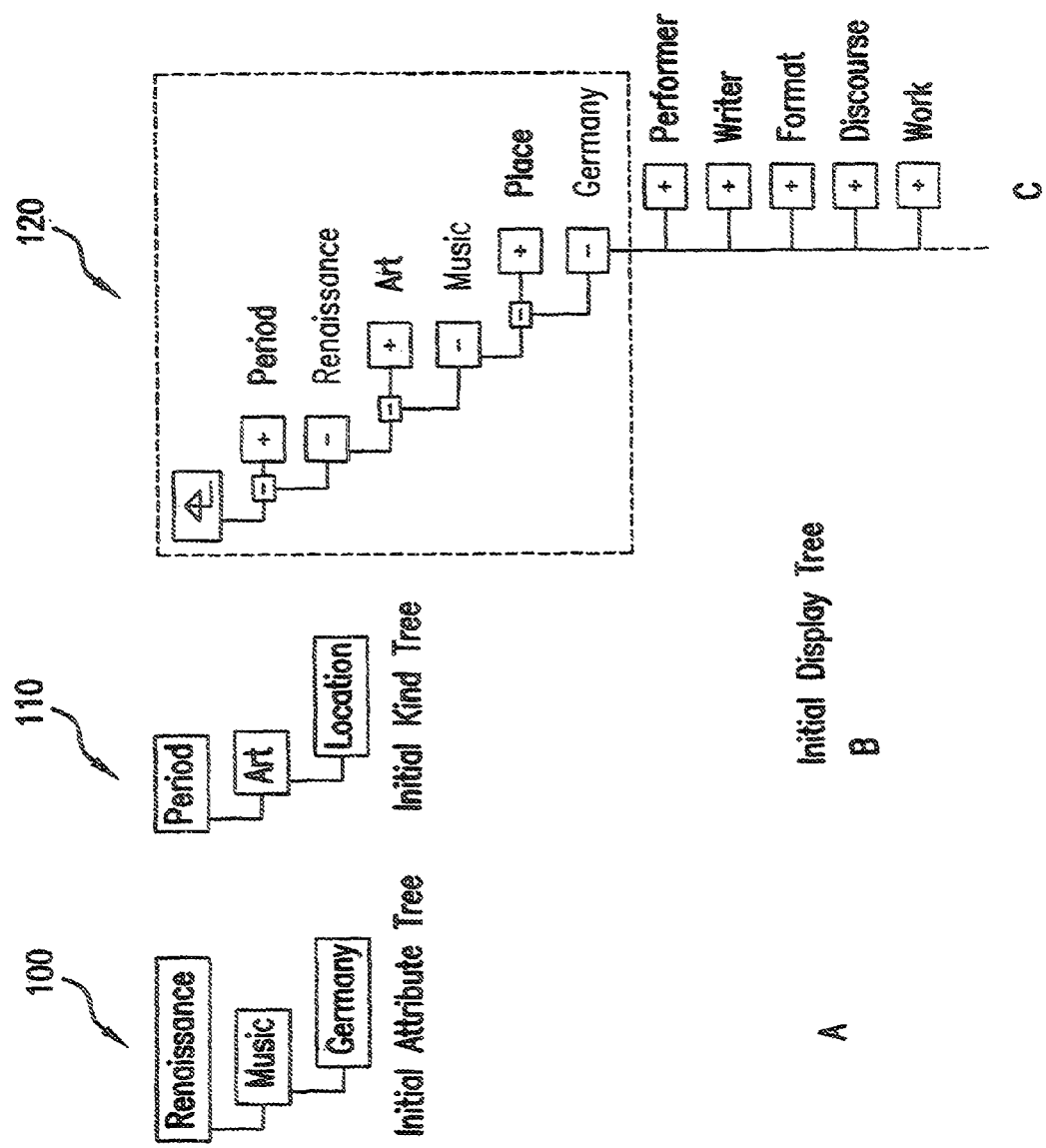
FIG. 1 shows the hierarchies of Attributes and of Kinds of Attributes generated in response to a search query and the combined and extended hierarchy first displayed in one embodiment of the invention.

The present invention will be discussed with reference to preferred embodiments of methods for administering databases, performing searches, and presenting search results and the contents of a collection to a user. Specific details, such as types of Kinds and Attributes, are set forth in order to provide a thorough understanding of the present invention. The preferred embodiments discussed herein should not be understood to limit the invention. Furthermore, for ease of understanding, certain method steps are delineated as separate steps; however, these steps should not be construed as necessarily distinct nor order dependent, in their performance.

Database Description

The distinct physical objects, or items, of the application are handled through the ItemManager, and their Attributes by the MetaItemManager. The mutable hierarchies of the invention are manipulated by the AttributeManager, which in the preferred embodiment does not even know that items, as such, exist. Thus, the ordering of Attributes in a displayed hierarchy is independent of factors such as, for example, the physical and/or logical location of objects associated with the Attribute in a hierarchical file structure. The user interface of an application interacts primarily with the AttributeManager. In the implementation described below, it uses the MetaItemManager only to report "how many items?" and small lists of item headers, and the ItemManager to obtain an item the user actually selects.

Classes

The following description follows the C++ style of object-oriented programming (OOP). A class definition sets up a structure with 'member' data and functions, but creates no examples of it. A declared instance of that class, with assigned memory values for the data members, is an object.

AttributeID

Preferably a simple data type such as unsigned integer, or perhaps long integer if the item universe is large and the application fine-grained.

Attribute

Each Attribute object (or simply Attribute) A has a name (a string meaningful to humans, as short as practical), a Kind (which need not be a data member of the class: see the AttributeManager discussion), an AttributeID and an AttributeTest object AT. Given the location in memory of an item Q, the public member functions of AT can:

1. determine whether $\underline{A}$ has a value for O;
2. return that value (true, false, numerical, enum, etc.):
3. modify the enum of return values, where applicable without re-coding. (For example, add a file type or project code.)

The public member functions of $\underline{A}$ itself can:

4. assign a name to $\underline{A}$;
5. return that name;

Most Attribute objects are created either by direct coding (the AttributeTest preferably includes specific, optimized code) or by specifying arguments to a member function of the Attribute's Kind. (For example, the Kind 'Period' would have member functions by which start, and end times can be set, and the resulting Attribute.2 would test dates or objects with date members or ranges for inclusion or overlap with that range.) In some cases the AttributeTest may involve calling for user decision, but in most applications these cases will be rare, even in the initial stage of populating the knowledge base. For optimization of the MetaItemManager, $\underline{A}$ preferably includes a private function to 6. predict the time needed to evaluate T on O, given its size, or on an ensemble of items, given their size distribution.

The use of this private function will be discussed further in connection with the MetaItemManager description discussed further below.

NonceAttribute

This class is derived from Attribute.

Functions in the Kind and Attribute Manager objects allow the creation of new Attributes, as in Kind.4 or AttributeManager.7, which may be permanent additions to the user's environment or merely 'for the nonce', useful in a particular session, but not worth retaining or hashing. (For coherence, a new Attribute should be hashed for all objects that can have Attributes of its Kind, but this is costly. The user may only wish to test it on a small sub-universe of objects, such as those added that week, so that direct evaluation on objects within that sub-universe may be more efficient.)

Where a NonceAttribute is created by a Kind K, it acquires K as its Kind. Where it is created by the AttributeManager, a new NonceKind may simultaneously be required.

KindID

KindID is preferably a simple data type, such as an unsigned integer or a character.

Kind

Each Kind K has a KindID and a KindTest object KT. Given the location in memory of an item O, the public member functions of KT can:

1. determine whether Attributes of Kind K have a value for O;
2. return a list of the AttributeIDs of all Attributes of Kind K which have the value "true" for O. (The list would typically be used by the IndexManager to create entries for O in hash tables, reverse index files, etc., as appropriate. For example, a Kind might be associated with the Attributes "contains the word W" for each word W in a lexicon L. Their AttributeIDs, assigned by a scheme for efficient storage with respect to the frequency of particular words, would be seen by the IndexManager: the words themselves would not.);
3. modify the set of Attributes in K, where applicable without re-coding. (For example, by modifying the lexicon L of recognized words.) Invoking this function may require rebuilding of indexes;
4. create a new NonceAttribute of Kind K, from arguments supplied to the function. (For example, create "contains the words 'parallel' and 'werewolf' at most 3 sentences apart", given the argument (parallel, werewolf, 3).) Such creation functions are application-specific:
5. change a NonceAttribute to persistent Attribute status; and
6. delete a NonceAttribute or Attribute, triggering any update required in the AttributeManager or SearchManager.

NonceKind

This class is derived from Kind. If a NonceAttribute "dated 1500-1600 and mentions Bill Clinton" is created, it needs a Kind, which is a logical combination of Date and ContainsText. Since this particular NonceAttribute has no true instances (except, according to some, Nostradamus), it should not become a persistent Attribute unless the user insists. A Kind created only to accommodate it should be equally ephemeral, to avoid clogging the data structure.

Item ID

This is a simple data type, such as an integer, long integer or something larger, according to the number of items for which an application may need unique identifiers.

ItemManager

An application uses a single instance of this class.

It assigns unique ItemIDs to the items, and produces them as required. It has public functions to:

1. bring an item into memory, returning a hook by which it may be displayed (as the user interface may do) or tested for the applicability, truth or value of an Attribute (as the MetaItemManager may do), using the test associated with that Attribute; and
2. return.

MetaItemManager

An application uses a single instance of this class. As far as can be seen from outside, the MetaItemManager knows the list of ItemIDs, and knows for each the applicability and (if applicable) value of every Attribute. Different implementations of the MetaItemManager are possible. In one implementation, a MetaItem object C hence the name C is maintained for each item, and a data member of the object for each Attribute and NonceAttribute. Data might be stored in this way or, in other implementations, in a relational database, hash tables, reverse index files, etc., or the value of an Attribute or NonceAttribute could be evaluated fresh using its AttributeTest directly on the item, as produced by Item Manager.1.

It is preferable for this internal logic of the MetaItemManager to be invisible. This is because the most efficient way to implement it can be affected by factors such as the size of the item universe, and the complexity of the AttributeTests used. An embodiment with an item universe of moderate size may use off-the-shelf database technology to support the necessary external function calls and still be fast enough to satisfy users. Optimization may be necessary for embodiments with larger numbers of items.

The MetaItemManager public member functions can:

1. return the Item IDs of all objects with a specified Attribute;
2. return the Item IDs of ail objects with boolean combinations (using and/or/not) of specified Attributes;
3. estimate the number of returns to (1) or (2) above (see next paragraph);
4. estimate whether these numbers exceed a specified N;
5. count the exact number of returns to (1) or (2) above.

Internally, it should in time have functions that can estimate from samples the time needed to test a specified Attribute on a set of objects with a specified size distribution, and the size distribution of a set of objects. Part of the optimization should arrange that un-hashed Attributes and NonceAttributes, which cost more time than index look-up, should look at as few objects as possible. If $\underline{A}$ is slower than $\underline{B}$, boolean evaluation of $\underline{A}$ and $\underline{B}$ should apply $\underline{B}$ first, then test $\underline{A}$ only on the positive instances of $\underline{B}$ (not test $\underline{A}$ on the whole universe, then identify common hits.) Dynamically planning this will require Attribute.6.

AttributeManager

An application uses a single instance of this class.

This contains the core quastic logic, managing, maintaining and exploiting the organization of Attributes into Kinds. For speedy manipulation it uses the KindIDs and AttributeIDs to represent the Kinds and Attributes, since it rarely needs the "internal" understanding of an Attribute represented by its Attribute Test. It knows, however, the Attribute corresponding to each AttributeID, and can thus call on the Attribute's member functions when necessary.

The computational use of the many-to-one Attribute-Kind relation is within the AttributeManager logic, so in the preferred embodiment the data of this relation are stored within this module, rather than (for instance) by giving objects in the Attribute class a member Kind pointer or member KindID. The Attribute-Kind relationships are determined manually or by other software elements: methods for such determination are not within the purview of the present invention. As far as the AttributeManager is concerned, the grouping of Attributes into Kinds is purely a formal many-to-one relation.

A Kind K is divisive for Kind L if, after grouping items according to Attributes of Kind L, we can subdivide them into genuinely smaller groupings (not all or none) by using Attributes of Kind K. In a universe of arts items, one might ask for music conducted by Sir Adrian Boult (an Attribute of Kind art followed by one of Kind conductor); but having separated out a grouping of items conducted by Sir Adrian Boult, one does not seek to separate the music from the architecture. Soloist and conductor are divisive for each other: soloist is not divisive for architect, or vice versa. The AttributeManager records (by a table, lists, etc., as convenient) which Kinds are divisive for which others. In some embodiments, this relation is dynamically determined by exhaustive inspection of the item universe (or, adequately, by sampling). In other embodiments, it is entered by hand and maintained statically.

More generally, a Kind K is divisive of a particular set S of items if S is subdivisible into genuinely smaller groupings by using Attributes of Kind K. (Divisiveness for Kind L is thus divisiveness of the set of all items for which Attributes of Kind L are defined.) This divisiveness will often be computed on the fly, rather than stored, but the computation may use stored divisiveness values between Kinds: if K is known statically to be not divisive for L, it is not divisive of any subset whose definition involves an Attribute of Kind L. As a generalization of the Yes/No definition of whether K is divisive, one may give it a numerical score: How far is the resulting subdivision from 'all' or 'none', and also how far from putting every item into its own Attribute group (as "complete filename" would), none of which would help in reducing the size of the list that must be looked at.

Typically, but not necessarily, the set S for which divisiveness of K is evaluated is the Possibility Set associated with a list L of Attributes and Kinds, as the collection of all those objects possessing each Attribute, or at least one Attribute of each Kind, included in L. In particular, the list L may be a query, defined as a list of one or more Attributes and Kinds, including Boolean combinations of such. An item I belongs to the Possibility set of L if each Attribute in L is true of I, and I has at least one Attribute belonging to each Kind K in L. Heuristics may be used to estimate divisiveness from samples of S or from stored divisiveness values attached to individual elements of L.

Among the Kinds divisive of K, a ranking $R_K$ (also recorded in the AttributeManager) is also maintained. The ranking is used by the user interface to determine the position of Kinds associated with items responsive to a search query in a hierarchical display. Various heuristics may be used to generate $R_K$, such as quantifying divisiveness, factor analysis (if Attributes of Kind K and of Kind L are highly correlated, rank higher the Kind with fewer Attributes), and so on. Simpler embodiments employ fixed $R_K$; in this case, Kinds suggested after a group of Attributes specified in a search depend only on the last Attribute specified in the search.

In a more powerful embodiment, the ranking used for a search query could be for the Possibility Set of the full query. If a sampling heuristic works fast enough, it should be used here. Otherwise a ranking $R_N$ could be formed fast by combining stored rankings attached to the Kinds of the Attributes in the query, such as the rankings $R_{Arts}$, $R_{Periods}$ and $R_{Location}$ (For example, form a weighted sum of the ranks each Kind has according to these three, and order Kinds accordingly.) If K has a low likelihood of usefulness according to any of the three rankings C in particular, if it fails to be divisive for one of them C it should be low according to the combination.

Among the Attributes of a common Kind K, a transitive 'implies' relation (referred to herein as an "implication") is recorded. Implications are required to be acyclic. For instance (again, with reference to the display examples discussed below), among Attributes of Kind Location, we need (Berlin implies Germany implies Europe), and in Kind Time, (Day implies Year implies Period). It will rarely be wise to set up this Kind of granularity as a system of levels (for instance, building in the US location format of street/town/state/country unfits a database for both Singapore's street/country and Korea's hierarchy of street/ku/dong/city/(optional state)/country. "Next level down from A" must be computable as a list of Attributes $\underline{B}$ that imply $\underline{A}$ with no intermediate $\underline{C}$ such that ($\underline{B}$ implies $\underline{C}$ implies $\underline{A}$), not from a global notion of level N.

That $\underline{A}$ implies $\underline{B}$ may sometimes be deduced automatically from the Attribute-Tests, or from examining items and determining that there exist items with Attribute $\underline{A}$, and that $\underline{B}$ holds for all of them. (Without requiring existence, we could conclude that Ruritania implies Europe, but also that it implies Antarctica.) Again, in some embodiments, the relationships may be entered by hand.

The Kind K is divisive of itself, if its Attributes have a non-empty 'implies' relation, which allows us (for instance) to group items using Location by country and later by city. An Attribute $\underline{A}$ of Kind K is broad if it implies no other Attribute of Kind K: Germany implies Europe, but if we do not include PlanetEarth as an Attribute of Kind Location, Europe is broad. (This may be relativized to implication within a grouping that a user has already pinned down, but in some embodiments it can be absolute.) Where necessary, grouping Attributes may be introduced to create an intuitive list of broad entries short enough to display. For example, surnames have no implications and are usually too many to list. For this case, the familiar alphabetical grouping is captured if we allow "beginning with B" as an Attribute of Kind Surname, implied by Bush and Borgia. If there are so many names that we need to use "beginning with A-D", "beginning with B", "beginning with Bo", etc., we also need the version of "broad" that is relativized to choices already made. Similarly, Westphalia should be broad if Germany is already specified, if A implies B we may also say that B is broader than A.

A frequently useful version of the 'implies' relation allows temporal dependence, setting date limits: 'Texas' should not imply 'Mexico' after 1836, or 'USA' before 1848. Where a span of time includes allowed times for an implication, 'implies' holds, so that 'Texas and $19^{th}$ Century' should imply both 'Mexico' and 'USA'.

Among Kinds, an 'implies not' exclusion relation may be stored, whereby (for instance) if an object has an Attribute of Kind 'SpatialExtent', such as 'Height' or 'Area', or of Kind 'Image' such as '.gif' or '.jpeg', it can be assumed not to have any Attribute of the Kind 'ContainsText'. Such excluded Attributes are then never tested on the object.

The AttributeManager's public member functions can:
1. return the Kind of an Attribute $\underline{A}$;
2. return the KindIDs of all broad Kinds divisive of K, in R-order, or the first N of these;
3. return the AttributeIDs of all broad Attributes of Kind K;
4. return the AttributeIDs of all Attributes of Kind K;
5. generate an AttributeTree from a KindTree;
6. extract a KindTree from an AttributeTree; and
7. edit the stored Kind and Attribute data, creating/deleting Kinds, Attributes and relations between them.

Kind Tree

This is a usually-small structure, used in organizing the user's current view, and is optimized for fast access and easy modification. It is manipulated within the AttributeManager.

It consists of a tree such as (in the music library example, using names to stand for the KindIDs at nodes)

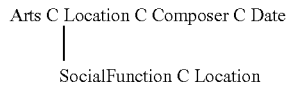

where the Kind at any node is divisive for any Kind nearer the root. It includes pointers in both directions, so that a node knows both its parent and its children.

AttributeTree

This is a tree of Attributes, with two-way pointers like a KindTree. Given the KindTree in the example above, the AttributeManager manager must be able to generate a tree that would have a root from which depend nodes for specific Attributes of Kind Arts, such as Painting, Music, etc., while from Music depend a set of broad location Attributes (perhaps Europe, North America, South America, Asia, Africa, . . . ), and so on. Note that this is still a data structure, not a visual format: in an implementation that displays it, how much is visible in the UI depends on user interaction in opening and closing nodes, just as Explorer reveals branches step by step. Our preferred implementation displays neither a KindTree nor an AttributeTree, but the alternating type discussed below under "User Interface".

Given an AttributeTree, the Attributes in each node's children can be sorted into Kinds (and depth within Kind, if some imply others) by the AttributeManager, extracting a KindTree.

These two processes are one-sidedly inverse; the KindTree extracted from the AttributeTree generated from a KindTree Q should be the same as Q, but starting with an arbitrary AttributeTree R, extracting a KindTree and generating an AttributeTree S from that may give an AttributeTree with nodes that were missing from R. If S=R, R is complete.

User Interface

The functioning of the database elements described above can best be explained in connection with an exemplary embodiment of a graphical user interface (GUI), though other GUIs may be developed to exploit the data organization of the present invention. The example below interacts with the user through a tree display, analogous to the trees used in Windows Explorer and many other programs, though these are normally exclusive in their semantics, putting each item as a 'leaf' on a unique point on the tree. Another approach would be to show boxed groups, like the 'folder' collections displayed by 'My Computer' under Windows, and their analogues in other operating systems. We also anticipate the development of more multi-dimensional displays, such as grouping items by age along one axis, size along another, and a frequency of use along a third. While the tree display below is our currently preferred first implementation, it is described here chiefly as an illustration of the power of the present invention's internal structure in accommodating to the search needs in the mind of the user.

The example discussed below is relevant to a database on European culture, with a structure of Kinds and Attributes that includes the table below. This table does not cover all the Kinds useful in a full implementation, nor all the useful Attributes for each Kind listed: and it does not specify the implications between broader and narrower Attributes of the same Kind, it shows the relationships between those Attributes and Kinds appearing in the exemplary figures discussed below. Note also that Attributes are not mutually exclusive, even within a Kind: a performer may sing and play several instruments, 'Wax cylinder' implies 'Audio recordings', and so on. Thus,

TABLE 1

| Kind | Attributes |
| --- | --- |
| Period | Renaissance, Baroque, Medieval, Big Band, Enlightenment, . . . |
| Art | Painting, Sculpture, Gardening, Music, Architecture, Drama, Dance, Landscape, Jewellery, Pottery, Fiction, . . . |
| Place | [Includes continents, regions, countries, states, cities, etc.] |
| Performer | Singer, Instrumentalist, Pianist, Flautist, Ensemble, Orchestra, Band, Quartet, Trio, Pavarotti, Elvis, Yo-Yo Ma, BBC Symphony Orchestra, . . . |
| Writer | Composer, Librettist, Arranger, Author, J S Bach, Bob Dylan, Kurt Weill, . . . |
| Work | Symphony, Song, Mass, Aria, Oratorio, Cantata, Opera, Music Video, Dance, . . . |
| Format | Live Performance, Audio recording, Video recording, Manuscript, Printed score, MIDI file, Wax cylinder, Vinyl LP, CD, . . . |
| Discourse | Book, Review, Article, Letter, Catalogue, . . . |
| Language | German, French, Italian, English, Japanese, Cantonese, Latin, Russian, . . . |
| Instrument | Wind, Woodwind, Brass, Strings, Percussion, Voice, Kazoo, Harpsichord, . . . |
| Social Function | Sacred, Military, Court, Festive, Polemic, Exercise, Amatory, Folksong, . . . |

A user begins a search by specifying a search string such as "Renaissance music in Germany". The system identifies Attributes mentioned, in this case Renaissance, Music and Germany, and takes their order as an initial basis for information display. In this embodiment, all search terms are existing Attributes, identified in a natural language search string. (Alternatively, the system might list Attributes and instruct the use to choose from among them when constructing a search query.) If a search term is not an existing Attribute, a NonceAttribute is created, and assigned to a Kind or an on-the-fly created NonceKind. Where it is constructed in terms of existing objects and methods, as in the example of "contains the words 'parallel' and 'werewolf' at most 3 sentences apart", given the argument (parallel, werewolf, 3), the AttributeManager identifies a corresponding Kind or builds an appropriate NonceKind and KindTest from the way in which existing methods have been combined. If good natural language understanding software is available the user's search string may be parsed to derive relationships between terms, and refine their meaning. (For example, "in" has a quite different meaning in "in Germany" versus "in German", and use of the latter restricts "German" to refer to the language and not the nationality.) However, in the present state of natural language software our preferred embodiment merely identifies (a) words recognized from a dictionary (b) the subset of these that are Attribute names, or synonyms of names, in the current application, and (c) unrecognized strings, if an introduced term U is unrecognized, as 'didgeridoo' might be for an application developed with Eurocentric data, the system categorizes it as a new Attribute and provides a dialogue box by which the user can identify its Kind as Instrument, to fit it into the application. If the term U has no Kind in the application and is not constructible by the application's methods (a musical example is unlikely to handle 'megatonnage', for example), the application informs the user that it is defaulting to the Attribute "the term U is contained in the object or in the associated metadata". Any larger creation of Kinds, and corresponding restructuring of the application design, is a task for application editing tools, and not for the general-user interface where ease of use is at a premium.

In the illustration above the UI uses these Attributes to construct an initial AttributeTree 100 (show in FIG. 1(*a*)) consisting of Renaissance->Music->Germany and passes this AttributeTree to AttributeManager.6, which creates and returns a corresponding KindTree (Period->Arts->Location) 110 (shown in FIG. 1(*b*)). Next, this KindTree is passed as an argument to AttributeManager.2, which returns a list of KindIDs of divisive Kinds. In our preferred embodiment, neither a KindTree nor an AttributeTree is displayed directly, instead, the user interface shows a DisplayTree 120 (show in FIG. 1(*c*)), which synthesizes the information in both, and extends them. Logically associated with any node N of this tree (but not necessarily constructed as a data list, and never displayed if it is large) is the Possibility Set of all those objects possessing the Attributes, or Attributes of the Kinds, appearing at N or above it in the tree.

Figure 2:
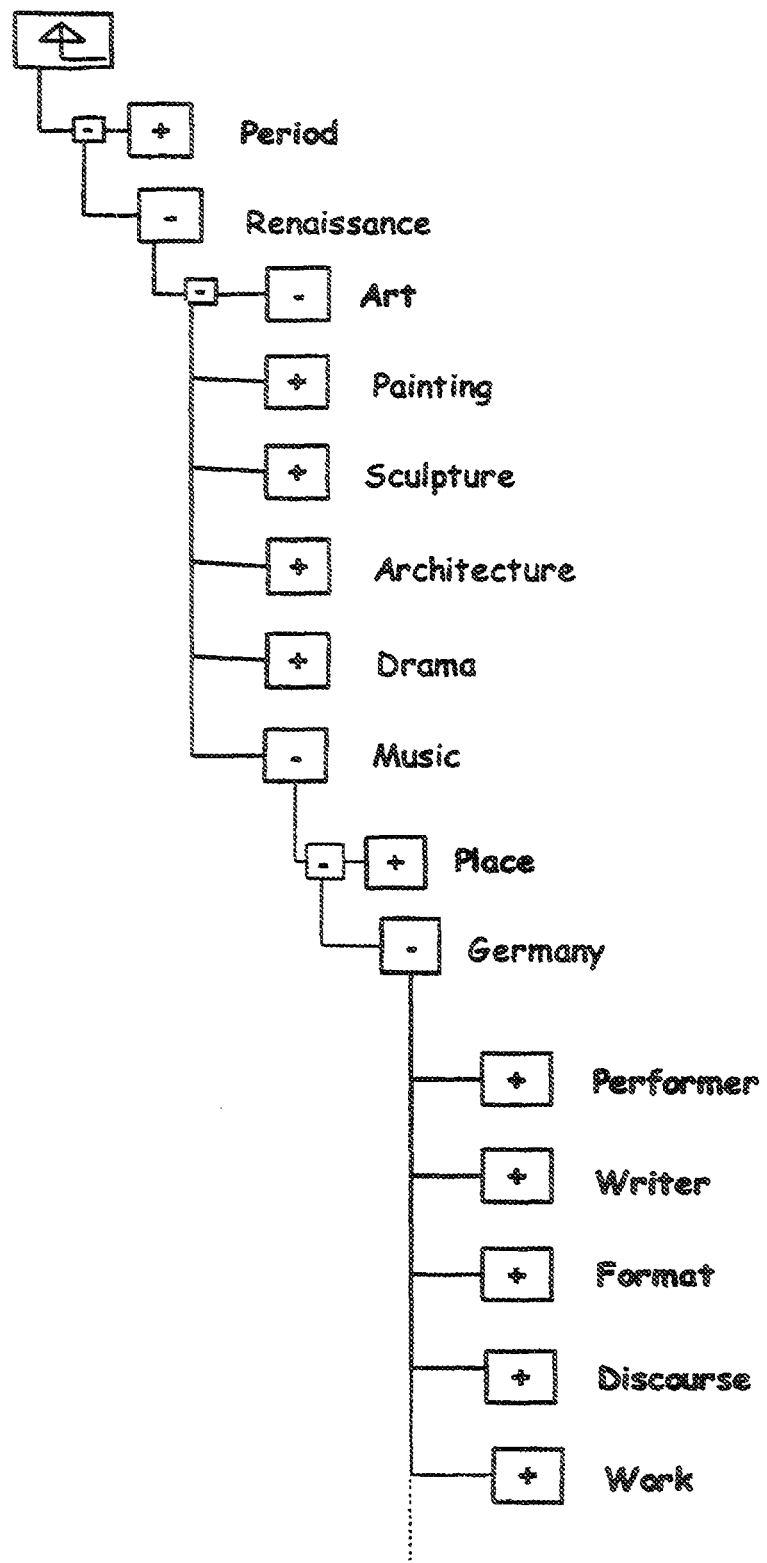
FIG. 2 shows an expansion of the displayed hierarchy of FIG. 1 after a user click.

The dashed line in FIG. 1 (*c*) (not part of the display) encloses the elements drawn directly from the KindTree 110 and AttributeTree 100, showing each Kind and the selected Attribute at the same indentation level. (The user may thus mentally distinguish it as a header, without explicitly learning to manipulate the formal structure of Attributes and Kinds.) Clicking on the '+' box for the Kind 'Art' expands the display (FIG. 2) to show the other Attributes belonging, to this Kind (for the purposes of our illustration. Painting, Sculpture, Architecture and Drama), and changes the '+' to the '−' indicator that clicking will contract it, and invert the '+' click just described. This illustrates the ability to display for the user other Attributes that were not specified in the search query, just as one often explores library shelves near the one found by index lookup of a particular book to find related books without a search term, and to learn more of the mental universe in which it exists. As shown in the transition between FIG. 1 and FIG. 2, a user who clicks on the '+' next to Art will learn (via the displayed Attributes) what other arts the system lists for the period. Similarly, if the user has narrowed down to German baroque harpsichord music, clicking on Instrument would show other instruments prevalent in German baroque music.

If the user clicks on a '−' node from which (not from the point to the left of which) a branch hangs, the entire branch and its ramifications vanish from the display.

We return now to the elements in FIG. 1(*c*) that are added outside the dashed line, a list of Kinds. These are selected either as a static list attached in the database to the lowest Kind in the current KindTree (in this illustration, the Kind 'Location'), or, in our preferred embodiment, dynamically generated as a list of those most divisive or otherwise highly ranked for the current Possibility Set, defined by the three Attributes of interest ('Renaissance', 'Music' and 'Germany'), The maximum number of Kinds selected may be a constant, or may be determined dynamically based upon the size of the existing AttributeTree to which the Kinds are to be added. The Kinds associated with this list of Kinds are then appended to the existing DisplayTree in rank order. For the sake of illustration, FIG. 1 (*c*) assumes that the Kinds added at this point are Performer, Writer, Format and Discourse. (See Table 1 for a selection of the corresponding Attributes.) Clicking on a dashed "There is a continuation" indicator adds some lower-ranked items to the display.

Although not shown in FIG. 1(*c*), in some embodiments the user interface displays the number of objects associated with each of the displayed Kinds and/or Attributes. In still other embodiments, other information indicative of size or quantity, such as size in bytes of digital objects associated with each of the displayed Kinds and/or Attributes, is presented to the user.

Figure 3:
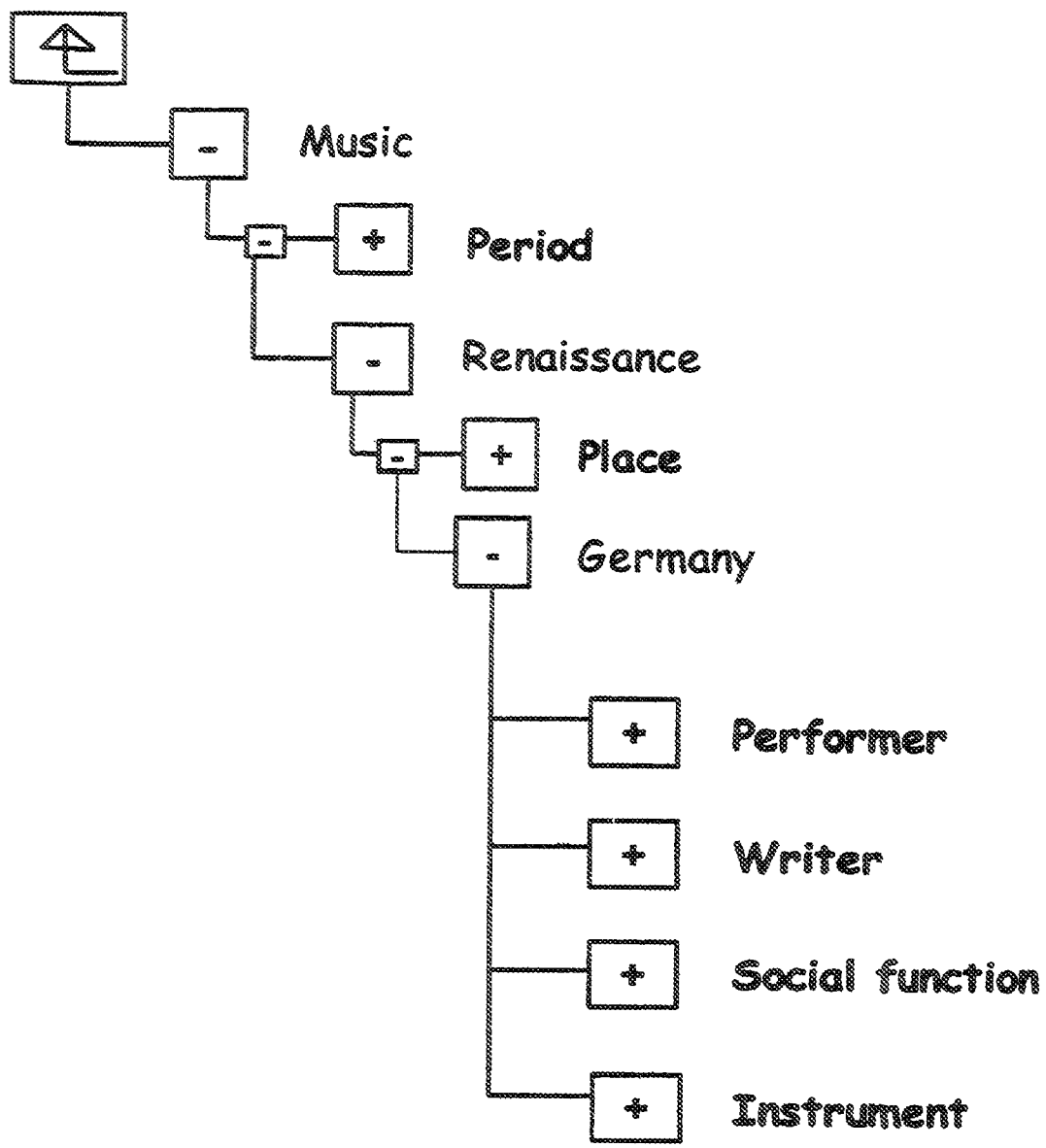
FIG. 3 shows the display hierarchy of FIG. 1 changed by the user dragging/dropping Art above Period.

Referring still to FIG. 1(*c*), it can be seen that the user interface displays the Attributes and their Kinds in the order in which they were specified (e.g., Renaissance/Period >music/Art> Germany/Place). The user interface allows the user to change the ordering (such as by 'dragging' an Attribute/Kind pair upward) as shown in FIG. 3, in which Music/Art has been moved ahead of Renaissance/Place. The effect of this reordering will depend upon the exact implementation. In embodiments using only static $R_K$-rankings of Kinds, the change in ordering discussed above would have no effect on the Kinds offered below the last-specified Attribute in the search query, Germany, which has not been moved. (If it moved upward, the Kinds displayed below those actively chosen so far by the user would be those highly ranked for the new lowest node, 'Music') In other embodiments, such as those in which rankings are dynamic, there may be a change in the Kinds displayed below the last-specified search query Attribute even if only higher-level Attributes are changed. This would occur, for example, in embodiments in which the rankings of Kinds depend upon Kinds and Attributes already specified, in order. In an example, position-dependent ranking can be determined by weighting each Attribute by its position: that is, in an embodiment where a higher 'score' means higher relevance, the score for the adjacent level (Places/Germany in FIG. 2) can be weighted by one half: the score for the next-higher level (Periods/Renaissance in FIG. 2) can be weighted by one quarter, and so forth, to arrive at a composite, position-dependent ranking. Similar weightings could apply to the dynamic use of such techniques as factor analysis in assigning ranks. In FIG. 3, it is assumed that such a dynamic algorithm has changed the rankings and the displayed set of options extending the tree.

In general, what happens when a node is expanded depends on a number of factors. If the Possibility List is conveniently small, it is shown as an explicit list of items. Otherwise, if the node corresponds to an Attribute (like Germany or Music/Renaissance/(Germany) of Kind K, the system offers Kinds of Attribute according to the static ranking $R_K$ or a ranking dynamically generated from the static rankings of K and its superiors in the tree, sampling of the Possibility Set, or other algorithms, as discussed above. If the node corresponds to a Kind, as in this example of clicking on 'Art', then the user is first presumed to want to specify an Attribute of that Kind before moving on. The ideal is therefore to display all the Attributes belonging to that Kind. If that list is too long for display, list only the broader Attributes of the Kind. (See the third-from-end paragraph of the Attribute Manager section.) For example, the non-mutually-exclusive Attributes 'Piano', 'Ocarina', etc., belong to 'Instrument', a Kind often important. The list of instruments is inconveniently long, so display can begin with broad Attributes like 'Woodwind', 'Brass', etc.

Figure 4:
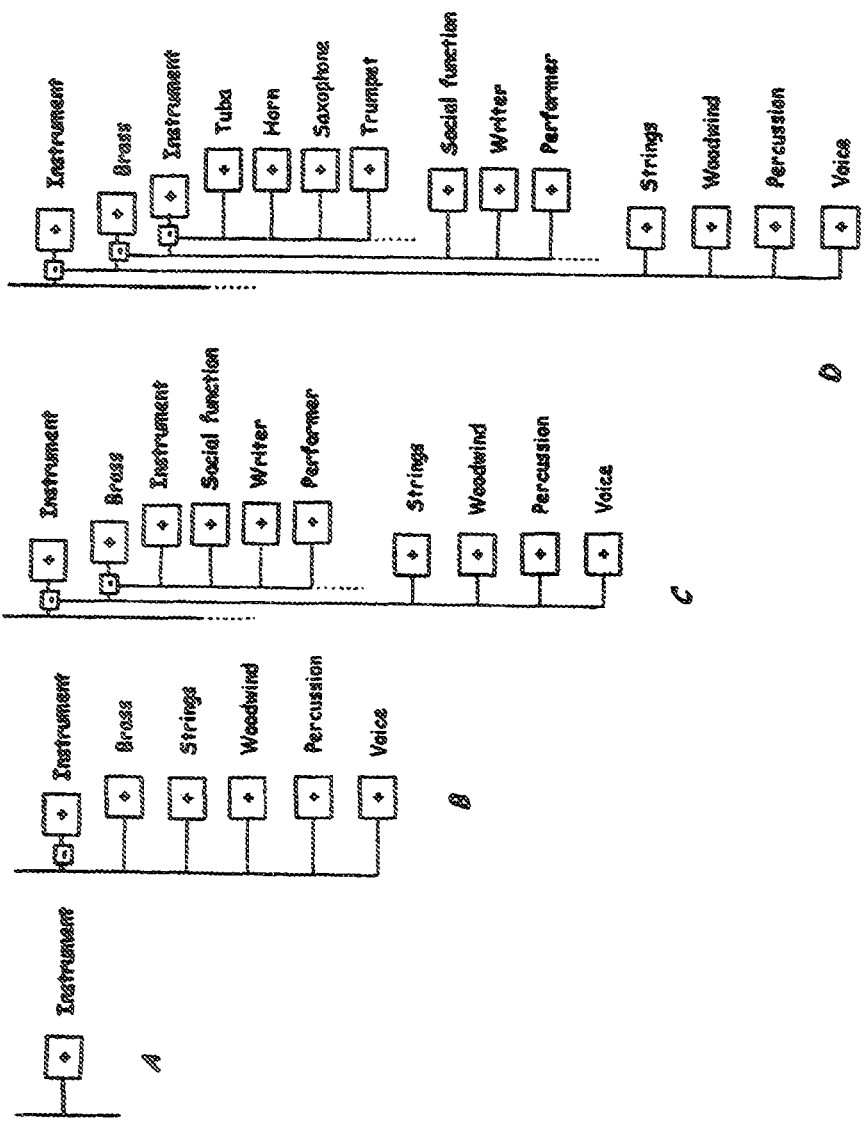
FIG. 4 shows a sequential growth of a section of the display of FIG. 1, in response to user input.
Figure 5:
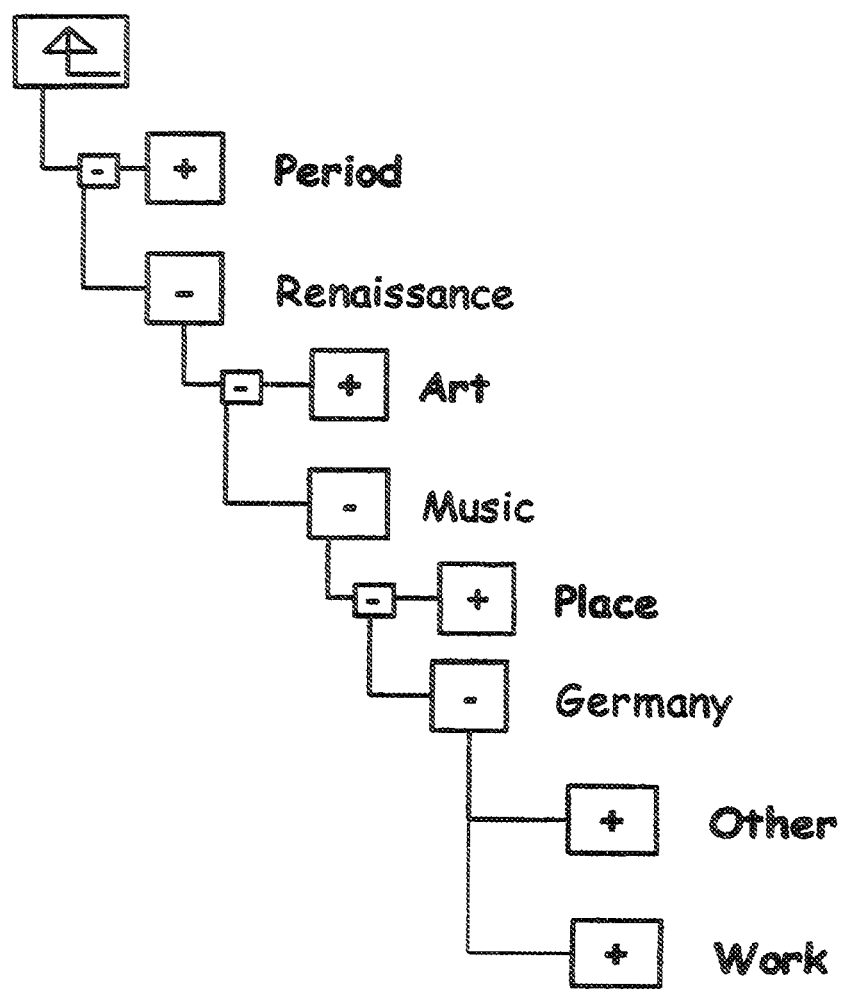
FIG. 5 shows a version of a tree in FIG. 1, reduced in response to user input.

When the Attribute list is restricted in this way, a user who clicks on a broad Attribute A may wish to refine further according to the Kind K of that Attribute. Therefore, the Kinds of Attribute offered start with K itself, before continuing with a ranked selection of Kinds divisive of K or of the NonceKind constructed from the nodes currently above A. In the above example, the user might first click on the Kind 'Instrument' (FIG. 4A) and see FIG. 4B, showing broad Attributes of that Kind. Clicking on one of these Attributes, such as 'Brass', the user sees more Kinds (FIG. 4C). The first of these is 'Instrument' again, but this time expanding it would show narrower Attributes such as 'Tuba' or 'Horn' (FIG. 4D). In a Kind with only a few Attributes, this 'second bite at the cherry' would be inappropriate: the system would offer all Attributes directly. Where there are many, scrolling down a long alphabetical list is slower than reducing to a shorter list by category. Moreover, a user will frequently be interested in the broad category itself, and want to group (say) Keyboard music by Period without separately clicking on harpsichord, piano, organ, etc.

The other Kinds are those highest-ranked for the current Possibility Set. If higher nodes have already fixed the Attribute of Kind 'Location' as 'London', this Kind is unlikely to be ranked high (though for some items, a London borough might be specified in the database), if no Attribute of this Kind has yet been chosen, 'Location' is still very divisive, and likely to be ranked high.

Relative to 'Music' and 'Work', an item such as a biography has no Attributes with Kinds which are divisive, hence it will not be a member of the Possibility Set. A Kind such as 'Author' will not appear as a suggested further branching of the Display Tree, since no element of the Possibility Set has an Attribute of that Kind. The user experience is that 'branches have contexts'. What we see under 'Germany' depends on whether above 'Germany' we see 'Music' or 'Fiction'. This is quite unlike a fixed hierarchy.

This 'click on Attributes, see Kinds' and vice versa is not explicit, to the user, who need not be exposed to either term, but it is an important part of the interaction dynamic. An exception to it occurs when the user does not want to refine the type of instrument, does want to retain the relevance of 'Instrument' (to exclude, for example, an essay on the theory of counterpoint), and wants to group the possibilities in additional ways (as the system did automatically in extending the KindTree and AttributeTree shown in FIG. 1 to the DisplayTree shown there). When a Kind node that is already expanded in the style of FIG. 4B or 4C is clicked, the expansion to the left of it disappears, and a more deeply indented list directly pendant from it shows the most highly ranked Kinds by which to extend that node. The illustration in FIG. 4D assumes that these are 'Social Function', 'Writer', 'Performer' and 'Format', but this depends on both the dataset and the ranking algorithm used, as well as the context set by higher nodes in the current tree. Clicking the '+' to its left reverts the display to FIG. 4B, clicking its '−' reverts it to FIG. 4A. Note that since the Attribute node 'Instrument' remains visible, the user may later drag and drop it to another position in the DisplayTree, where it can still be expanded to show its Kinds.

By default, when the UI moves 'Work' to attach under 'Germany' in the tree, it stands clear of the other nodes shown there. It could as easily move to the top as the bottom position, but either choice makes easier the user's step in grouping the rest and collapsing them. Such collapse to an 'Other' node (Reduction of FIG. 1 to FIG. 5), rather than hide all but a single option like the single Period 'Renaissance' in FIG. 3, leaves a more obvious way to return to and explore these other options, either in situ or dragging and dropping them to other contexts in the Display free, below other choices.

The same logic may be used at any level in the tree.

Figure 6:
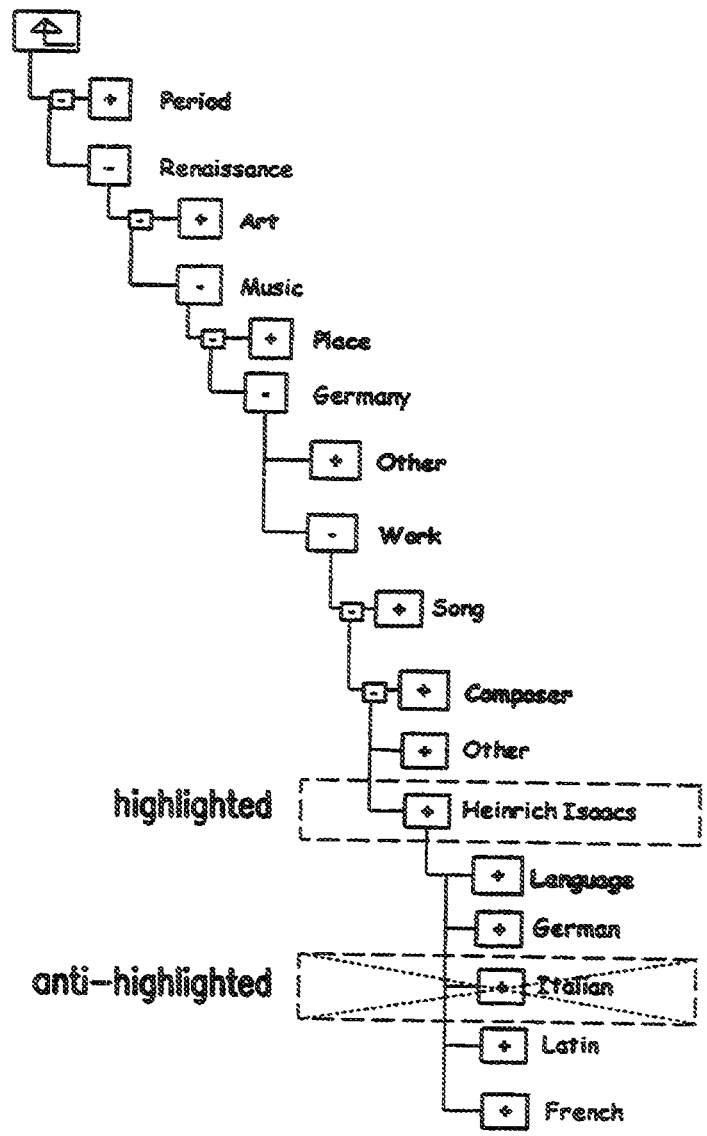
FIG. 6 shows generation of a compound query by selecting and anti-selecting nodes in the display hierarchy of FIG. 1.

In an additional feature which may be added to the graphical user interface, the user may at any point construct a search query using both a standard text entry window and the selection and anti-selection of DisplayTree nodes with the mouse. In a DisplayTree that the user has further expanded by the above methods. FIG. 6 shows the building of a compound search predicate P. In this example the user highlights the Attribute 'Heinrich Isaacs' of Kind 'Composer', which specifies that it must be true, and anti-highlights the Attribute 'Italian' of Kind 'Language' to specify that it must be false. All Attributes above these on the DisplayTree ('Song', 'Germany', 'Renaissance' and 'Music') must be true. If the predicate P constructed from these does not imply that Attributes of Kind 'ContainsText' are excluded (as often it will), then the system displays a box labeled 'contains text' where the user may add an Attribute of this Kind to P, quickly building a powerful compound search query. An Options interface lets the user specify common constraints like "whole word only" and "match case", and less common ones like "synonyms" (where the search engine expands the search list using a thesaurus) and "translate" (using a dictionary). These options would hopelessly overexpand a search with a typical keyword-driven engine, as most words have many more synonyms and translations than are relevant to any one search. They become far more useful in the context of combination with the compound condition above.

In the embodiment described above, the process starts with the specification of a search query by the user. It is also possible to start the process with an initial display of some subset of Kinds and/or Attributes. For example, an initial display may have a single Kind such as Period or Art and an initial list of Attributes beneath the single displayed Kind. Alternatively, the user may be presented with an initial display that includes multiple Kinds as well as a list of broad Attributes for those Kinds. The user may then manipulate this initial display using the techniques discussed above to explore the database and locate objects of interest.

Other Applications

The present invention is not specific to music, though the above example illustrates its power in arranging musical items. The same data structure can be applied in improving user interaction with other sets of items, as described below.

1. Files on a PC

Currently, a PC user is over-exposed to engineering details of how files are stored. The system needs to know the hard disc which contains an object, and indeed the sector of that disc, and the numerical address. To the user, the disc is often no more important than those other details, which are displayed only via highly technical tools. However, all current displays begin with the disc information.

This is a typical example of a way of grouping that can be relevant to the user (in particular, if one or more drives are removable), but is frequently a distraction. A user may have a project which involves programming, proposal documents, spreadsheets and also a set of large data files, such as images, 3D scans, animations or music, if these large files require adding a new hard disk to the system, it should not be necessary to move all these other files to the new disk, merely to show all the project's elements in a single display without other material.

Windows search tools let the user look for named file extensions, such as .doc for Word files, but not for 'all documents, as opposed to images or code'. File associations make a click on a file call up 'the' software appropriate to its type, and after software installation the user must often rescue file types from annoying changes. However, a good program for modifying images is often slow and awkward for sorting them, and software for converting PostScript files to .pdf should not take precedence over software for viewing them 'as is'. Some types can contain either text or graphics, and may be opened with different software according to the user's needs. "Can be opened by [ . . . ]" is a natural Kind, whose Attributes identify the relevant programs. These examples illustrate that file types belong in overlapping groups, making the data structure of the present invention a useful tool in presentation to the user.

The table below lists some (only) of the Kinds of Attribute that can be evaluated from data stored in existing operating systems or simple extensions of such, from metadata stored in existing file formats or simple extensions of such, or data easily extracted by simple algorithms. (For instance, most domains of activity have unique vocabulary items such as homeomorphism, bullpen or fisting by which they can be recognized as used or referenced in a document. A background process hashing document files for efficient word search can at the same time extract and store these classificatory data, avoiding the need to look inside most files when a user is looking for something or finding out what is present.) The table illustrates Kinds by values of exemplary Attributes belonging to them, narrow like file extension or name, or broader, like 'Creation' as an Attribute whose Kind is Date, as is 'created on Jun. 19, 1945' which implies it. Where convenient, an Attribute is signaled by file extension.

TABLE 2

| Kind | Example Attributes |
| --- | --- |
| Image | .a11, .amg, .art, .bif, .bmp, .bw, .clr, .cpi, .crw, .csp, .djvu, .emf, .fif, .fpx, .gfb, .gif, .hdf, .hs2, .hsi, .iax, .ica, .icl, .icn, .ico, .iff, .ifs, .imq, .int, .inta, .jpeg, .jpg, .jpe, .kdc, .ldf, .lwf, .mag, .pbm, .pcd, .pcx, .pdf, .pdd, .pgm, .spd, .pct, .pic, .pict, .pix, .png, .pov, .ppm, .psd,. ras, .rgb, .rgba, .rla, .rle, .rs, .sct, .sgi, .sid, .syn, .tga, .tif, .tiff, .ttf, .vif, .wmf, .x, .xbm, .xpm, .xr, .xwd, . . . |
| Animation | .ani, .anm, .avi, .awm, .cmv, .dl, .flc, .fli, .gl, .m3d, .mpg, .mwf, .qt, .sec, .seq, .van, .vue, . . . |
| Document | .adx, .ans, .asc, .aw, .bbl, .cdk, .chi, .ctx, .dif, .doc, .dox, .dx, .dtp, .dvi, .epi, .eps, .eth, .etx, .evy, .ewd, .faq, .fin .htm, .html, .html, .hp8, .hpm, .inf, .iwa, .iwp, .jw, .lgf, .lj, .lwd, .m11, .mcw, .met, .mm, .mss, .msw, .nb, .nws, .ocr, .oli, .oti, .pb1, .pc8, .pcw, .pfc, .pm3, .pm4, .pm5, .prn, .ps, .pw, .pwp, .qxd, .rft, .rtf, .rtl, .rpl, .sam, .cc, .sdw, .sgf, .sm, .spr, .stx, .svd, .swp, .tex, .txt, .vw, .wbk, .wkb, .wmc, .wn, .wp, .wp5, .wpd, .wri, .wps, .ws, .ws2, .wst, .wsd, .wxp, .xwp, .xy, .xy3, .xyw, .zdg, . . . |
| Project | 4D locator, Brain transplant simulator, Robot mosquito, Foggy Bottom ecology, . . . |
| Database | .apx, .bb, .bib, .bsc, .cdb, .cix, .crp, .cvt, .db, .db2, .db3, .dbf, .dbk, .dbs, .dbs, .dif, .dsd, .dtf, .fw, .fw2, .fw3, .mdb, .ndb, .pfs, .px, .rpd, .tdb, .wdb, . . . |
| Spreadsheet | .bwb, .col, .fm, .fm1., .fm3, .imp, .lcw, .lss, .mdl, .pln, .qbw, .wb2, .wk1,, .wk3, .wk4, .wke, .wkq, .wks, .xls, . . . |
| Game record | .sav, . . . |
| Driver | .386, .apc, .apd, .apf, .api, .asd, .bgi, .dev, .dos, .drv, .dsp, .ex3, .fm3, .gr2, .in3, .lbr, .lpc, .mcp, .pdv, .pgi, . . . |
| Executable | Installed Application, locally compiled program, C, FORTRAN, C++, Basic, Java, . . . |
| Computer Aided Design | .cad, .mcp, .pn3, .ppl, .pr2, .pr3, .prd, .prf, .prn, .prt, .pt3, .qlp, .qpr, .sc, .sc3, .spl, .sps, .sys, .vga, .vgd, .vid, .vrs, .vxd, .wrs, . . . |
| Code | Program, header, library, C, C++, Java, . . . |
| Can be opened by [Y] | Word, PhotoShop, AutoCAD, PCTeX, Excel, MSProject, . . . |
| Original Author | William Shakespeare, . . . |
| Change Author[s] | Thomas Bowdler, . . . |
| Date | Creation, Acquisition, Last read, Last modified, . . |
| Size | 93 KB, . . . |

TABLE 2-continued

| Kind | Example Attributes |
| --- | --- |
| Users/groups who can access | Tim, Raghu, Mike, Security, . . . |
| Users who have accessed | Tim, Raghu, . . . |
| File name | #3634170.1-9505-001-27QuasmApp.doc, . . . |
| Document title | A Title of the Invention: search and presentation engine, . . . |
| Document contents | Text, Figures, Animations, Math formulas, Spreadsheets, . . . |
| Vocabulary used | Mathematics, Topology, Differential topology, Baseball, Erotica, . . . |

Other useful Kinds and Attributes, requiring a more integrated system to establish, include among others.

TABLE 3

| >Created as a version of' | OriginalFileID, New, unknown. |
| --- | --- |
| In-mail it was attached to | MailID1, MailID2, . . . |
| Out-mail it has been attached to | MailIDX, MailIDY, . . . |

With an interface analogous to the Display Trees illustrated for the music example, or any other interface which makes it manipulable to the user, this data structure makes it simple for the user to identify large files that were acquired long ago and never accessed (prime candidates for deletion or archiving, to save disc space), to find documents by domain and project without searching on a 'contains text' key, and so forth. As in the previously discussed embodiment, the files (objects). Attributes and Kinds are displayed in a hierarchical format that is independent of the position of the files in the hierarchical filing system. Thus, files from many different folders (in the language of Unix or Linux, directories) may be positioned in the same position on the hierarchical display even though these files are in different positions: in the file hierarchy. Similarly, an Attribute associated with files on a lower level of a file hierarchy may be displayed in a higher level than an Attribute associated only with files on higher levels. The same is true for Kinds.

2. Electronic Mail

In preferred embodiments this application is integrated with the file manager above, but it can also be implemented as a stand-alone mail client. Current clients require users to leave incoming mail in an Inbox of limited capacity, or to put it into mutually exclusive folders (sorted by author? by group? by project? by sexual preference?) which are convenient for some searches but awkward for others. A client exploiting the present invention would extract and store Attributes and Kinds of types illustrated by those listed below, so that a user can see mail grouped as convenient at one moment without foreclosing the use of other views at later times.

The illustrative Kinds and Attributes below may be read from header information (already standard, or added in a corporate mail application), recorded from interactions with the program itself, or extracted by similar tools to those mentioned above for files. The examples illustrate that many of these Kinds may include broad as well as narrow Attributes.

TABLE 4

| Kind | Example Attributes |
| --- | --- |
| Sender: | Japanese-name, Raghu, Tim, Mailserver, . . . |
| To: | International Herald Tribune, European-name, Raghu, . . . |
| Cc: | Sales, Henry, . . . |
| Bcc: | Legal, Mildred Tannhauser, . . . |
| Attachment: | None, Image, Document, Spreadsheet, Busplan.xls, #3634170.1-9505-001-27QuasmApp.doc, . . . |
| Date: | Sent, Received, First read, Most recently read, . . . |
| Source time zone$^i$ | GMT + 7 hrs |
| Vocabulary used | Mathematics, Topology, Differential topology, Baseball, Erotica, . . . |
| Topics identified | Project name, money, budget, family member, . . . |
| URLs mentioned | None, Repeated in other mail from Sender, Unique, http://www.madscientist.com/, . . . |
| Group Ids | From, To, Cc, Bcc, Engineering, Microbotics, BGIM, . . . |
| Project IDs | From, To, Cc, Bcc, Robot mosquito, . . . |
| Encryption status | Encrypted, Public key used, . . . |
| Signature file used | "Been there, done that, died of it", "General Manager, Sales", . . . |
| Languages identified | Latin, Korean, Fortran, Perl, . . . |
| . . . | . . . |

As the examples illustrate, group membership need not be exclusive. A sender may belong to overlapping groups, as well as participate in multiple projects. Traditional company organization has tended to a strict tree structure, for reasons of comprehensibility and clear line of command. Some attempted replacements have involved 'matrix' grouping of employees, both by specialty (software, or laser optics, accounting, etc.) and by project. This conceptual structure has usually been equally rigid but less comprehensible, and has not yet become widespread. The present invention makes the flexible multi-view grouping of employees as intuitive as the example above for music. We anticipate its implementation in management software, but this is not our preferred first implementation at this time.

3. Web Navigation

To label the entire World Wide Web with an appropriate structure of Kinds and Attributes is an impractical goal. Even the Yahoo search system, which creates and stores only enough information to place a web page in its single tree structure, cannot keep pace with the growth of the Web. However, a Kinds and Attributes structure can be extremely effective in grouping the pages that a given user C or a collection of users, such as a group, department, or company c has visited. Current browsers store "what has been visited" only as a list of URLs and titles, retained for a few days, limiting the utility of search within it: users are invited to create 'bookmarks' which quickly become an unmanageable heap. Using the metadata that is increasingly attached to web pages, the enlarged classification by top level domains, language and topic tests like those mentioned above, tests for forms (with mention of credit cards, shopping cart logic, membership, etc.), counts of multiple visits, and so on, proper use of a Kinds and Attributes structure can automatically make the visited subset of the web a well mapped environment, in which pages are easily found according to need. This leaves the 'bookmark' to its more useful role, as one of a few shortcuts to sites the user visits frequently, for instance to see updated news. Moreover, simple clustering tools such as identifying a set of twenty words and a set of pages which each use at least fifteen of those words, while other sites visited use at most two, can identify natural groups: group membership then becomes an Attribute of Kind 'Topic', with a default identifier (user-changeable) given by the word that best separates the page set from its complement in the visited universe.

System Structure

Figure 7:
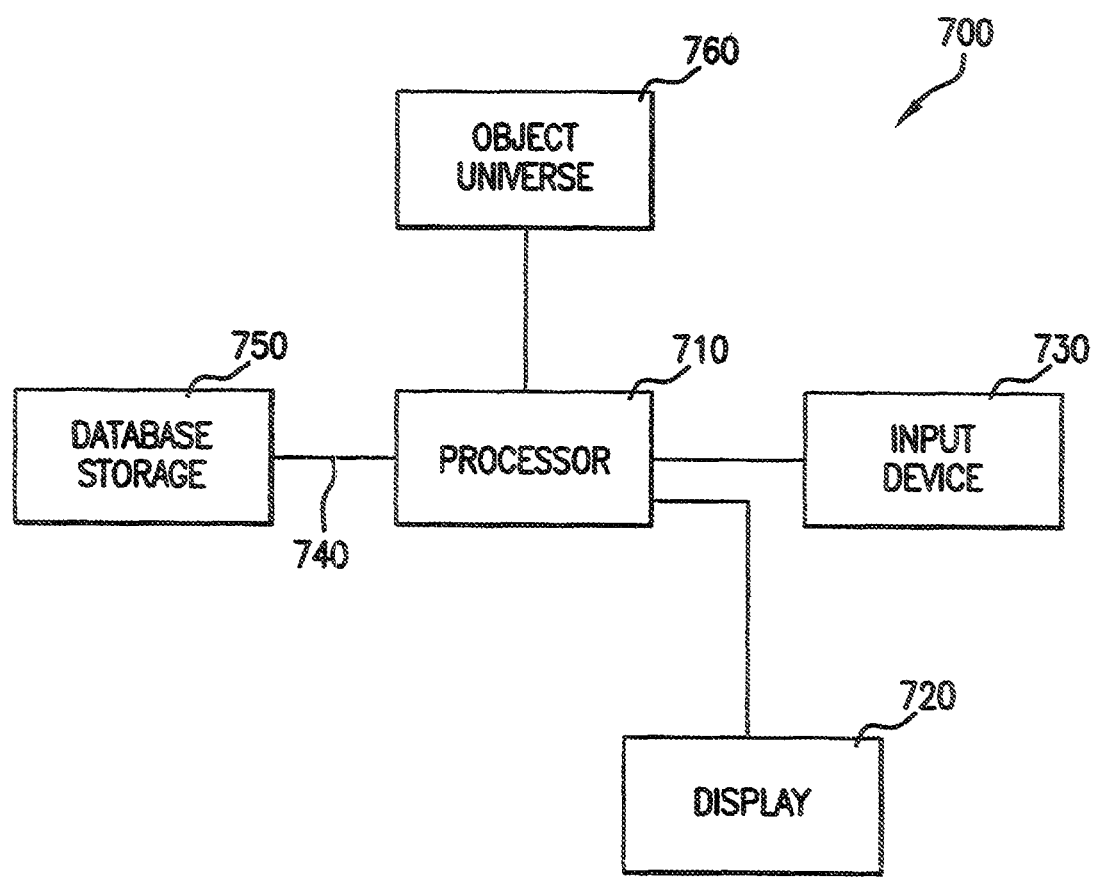
FIG. 7 is a block diagram of a system according to an embodiment of the invention.

A system 700 according to one embodiment of the invention is illustrated in FIG. 7. The system includes a processor 710 connected to a display 720 and an input device 730. The input device 730 is used to specify a search request and, when desired, select/specify Kinds. Attributes and/or objects which exist in an object universe 760 (which may exist on the same physical device as the database storage 750), such as the file system of a PC or network, or the internet. Attributes of objects in the object universe 760 are stored in the database storage 750, which is connected via link 740 to the process 710. A search or content discovery process looks initially, and in some case only, at this stored data until a tractable subpopulation of the object 760 is identified, after which object universe members themselves may be tested directly for unstored Attribute values. Search and content discovery results are displayed on the display 720, showing identifiers of selected object universe members. The user may then use the input device 730 to specify which of such members are to be delivered, opened and displayed on the display 720, to be downloaded and locally stored, to be printed, to be transmitted elsewhere, to be statistically analyzed, or to be otherwise processed as an application may permit or require, in the absence of copyright or other obstructions to such delivery and processing. It will be apparent to those of skill in the art that the system 700 may be implemented on a variety of platforms. In some embodiments, the system 700 is implemented on personal computer. In other embodiments, the system 700 is implemented on a larger scale with the processor 710 being located in a central location and connected (via LAN, WAN, Internet, etc.) to a plurality of integrated displays 720/input devices 730 in the form of terminals (which themselves may comprise personal computers) and large scale storage devices such as RAIDs (redundant arrays of inexpensive disks).

Numerous other modifications and variations of the present invention are possible in light of the above teachings. It is therefore to be understood that within the scope of the appended claims, the invention may be practiced otherwise than as specifically described herein.

What is claimed is:

1. A method for searching a database of Objects, in which each Object is associated with a plurality of Attributes, each Attribute is associated with a Kind, and each Kind is associated with a plurality of Attributes, comprising:
performing processing associated with receiving, utilizing a computer, search criteria from a user, the search criteria comprising an Attribute;
performing processing associated with creating, utilizing the computer, a Nonceattribute using the search criteria;
performing processing associated with inputting, utilizing the computer, a search utilizing the Nonceattribute;
performing processing associated with identifying, utilizing the computer, all Objects having the Nonceattribute;
performing processing associated with identifying, utilizing the computer, all Attributes associated with the Objects;
performing processing associated with identifying, utilizing the computer, all Kinds associated with the Attributes;
performing processing associated with applying to the Kinds and Attributes so identified a ranking criterion, wherein the ranking criterion is used by a user interface to determine the position of Kinds associated with items responsive to the search in a hierarchical display; and performing processing associated with displaying, utilizing the computer, the highest-ranked portion of the Kinds and the highest-ranked portion of the Attributes that can readably be shown in a search result display, the search result display presented in a mutable hierarchical format independent of a location of an object in a default hierarchical structure.

2. The method of claim 1, wherein the ranking criterion is fixed independently of the data.

3. The method of claim 1, wherein the ranking criterion is divisiveness.

4. The method of claim 1, wherein the ranking criterion is constructed heuristically by statistical sampling.

5. The method of claim 1, wherein the ranking criterion uses factor analysis to avoid presenting highly correlated Attributes in a display.

6. The method of claim 1, wherein the ranking criterion is created by combining stored rank values according to other ranking criteria.

7. The method of claim 1, wherein the method optimizes speed in obtaining a list of objects satisfying a search query by testing parts of the search query in an order dependent on an estimate of the time required for the test.

8. The method of claim 1, wherein the user interface enables the user to exclude Attributes of a user-selected Kind from the search.

9. The method of claim 1, wherein the user interface enables the user to exclude Objects having a user-selected Attribute from the search.

10. A system for searching a database of Objects, in which each Object is associated with a plurality of Attributes, each Attribute is associated with a Kind, and each Kind is associated with a plurality of Attributes, comprising:

performing processing associated with receiving, utilizing a computer, search criteria from a user, the search criteria comprising an Attribute;

performing processing associated with creating, utilizing the computer, a Nonceattribute using the search criteria;

performing processing associated with inputting, utilizing the computer, a search utilizing the Nonceattribute;

performing processing associated with identifying, utilizing the computer, all Objects having the Nonceattribute;

performing processing associated with identifying, utilizing the computer, all Attributes associated with the Objects;

performing processing associated with identifying, utilizing the computer, all Kinds associated with the Attributes;

performing processing associated with applying to the Kinds and Attributes so identified a ranking criterion, wherein the ranking criterion is used by a user interface to determine the position of Kinds associated with items responsive to the search in a hierarchical display; and performing processing associated with displaying, utilizing the computer, the highest-ranked portion of the Kinds and the highest-ranked portion of the Attributes that can readably be shown in a search result display, the search result display presented in a mutable hierarchical format independent of a location of an object in a default hierarchical structure.

11. The system of claim 10, wherein the ranking criterion is fixed independently of the data.

12. The system of claim 10, wherein the ranking criterion is divisiveness.

13. The system of claim 10, wherein the ranking criterion is constructed heuristically by statistical sampling.

14. The system of claim 10, wherein the ranking criterion uses factor analysis to avoid presenting highly correlated Attributes in a display.

15. The system of claim 10, wherein the ranking criterion is created by combining stored rank values according to other ranking criteria.

16. The system of claim 10, wherein the system optimizes speed in obtaining a list of objects satisfying a search query by testing parts of the search query in an order dependent on an estimate of the time required for the test.

17. The system of claim 10, wherein the user interface of the system enables the user to exclude Attributes of a user-selected Kind from the search.

18. The system of claim 10, wherein the user interface of the system enables the user to exclude Objects having a user-selected Attribute from the search.

* * * * *